Patented Aug. 16, 1949

2,478,988

UNITED STATES PATENT OFFICE 2,478,988

PROCESS FOR IMPROVING THE FOAM OF FERMENTED MALT BEVERAGES AND PRODUCT OBTAINED THEREBY

James S. Wallerstein, Arthur L. Schade, and Hilton B. Levy, New York, N. Y., assignors, by mesne assignments, to Wallerstein Company, Inc., New York, N. Y., a corporation of New York No Drawing. Application March 5, 1947, Serial No. 732,650

10 Claims. (Cl. 99—48)

The present invention relates to fermented malt beverages, and more particularly to beverages of this type characterized by the capacity for forming a stable, that is, a long-lived foam.

Fermented malt beverages include beer, ale, porter, stout, etc. The present invention will be further described in connection with the treatment of beer as this beverage is by far the most popular of the fermented malt drinks, but it will be understood that the improvements described hereinbelow can be applied to the other known fermented malt beverages.

Fermented malt beverages depend for their appeal on their body, palatability, appearance (i. e. color, clarity) and on the foam head which they form on pouring. Beers with a persistent foam are much preferred by the beer drinker to beers that have a short-lived foam.

The formation of a large initial volume of foam may be readily controlled, as, for example, by the manner of pouring the beverage or by the degree of carbonation. It is extremely difficult, however, to develope a persistent or enduring foam which maintains its head for a period of many minutes—the period of time which may be required for consumption of the beer—and at the same time avoid impairing the brilliancy, palatability or flavor of the beverage.

Beer foam is produced by the presence in beer of certain proteins, gums, hop resins, minute traces of esters, organic acids and higher alcohols. These materials lower the surface tension, and at the surface of the beverage they bring about the formation of a firm interlocking network which entangles or entraps the gas bubbles as they rise to the surface. The effect is to form viscous envelopes around the bubbles, and thus to prevent them from coalescing and breaking together into larger bubbles which would disrupt the foam. This stabilizing effect makes beer foam much more enduring than temporary froth produced in carbonated soft drinks.

It is an important objective of the brewing art to produce beers with persistent and stable foams. Any factor by which this may be accomplished without disadvantageously affecting the quality, flavor, or appearance of the beer can be regarded as a significant advance in such art.

It is accordingly the general object of the present invention to provide fermented malt beverages whose foam-head is longer-lasting in character than the foam-head produced by the normal components of these beverages as at present manufactured.

It is a more specific object of the invention to improve the foam-forming properties of fermented malt beverages by adding thereto a material which is entirely non-toxic, is stable under acid conditions, and will not cause precipitation or turbidity even on long storage.

It is a further object of the invention to improve the lasting qualities of the foam-head of fermented beverages by adding to such beverages at any suitable time in the course of their manufacture, but preferably after the fermenting and initial or coarse filtering, and prior to the storage period, a small quantity of a soluble, non-toxic and acid-stable alginate of an alcohol.

We have discovered that the foam of beer may be prolonged in a simple and economical manner by the addition to the beer of small amounts of a water-soluble, heat-stable, organic alginate. A suitable organic alginate is that now available on the market under the name "Kelcoloid HV" and manufactured by the Kelco Company of San Diego, California, the alginate being a propylene glycol alginate, the "HV" standing for "high viscosity." Propylene glycol alginate is a completely harmless and edible material. Although many forms of alginates are known, so far as we have been able to determine, only the organic alginates like propylene glycol alginate are of such nature as to be wholly soluble at the acid reaction of beer. This solubility characteristic permits the addition of, for example, propylene glycol alginate to beer without causing any turbidity in the final product even after prolonged standing. The addition of the propylene glycol alginate improves the flavor and body of the beer and produces a smooth, pleasing taste. When solutions of, for example, propylene glycol alginate are added to beer foam in a concentration of 50 to 500 parts per million, the duration of the foam is greatly increased and a persistent froth is produced. Preparations of the propylene glycol alginate are particularly valuable when they are of a high viscosity type, as they then increase the foam duration period many times.

Propylene glycol alginate is produced by reacting alginic acid with propylene oxide in the presence of water and is readily soluble under proper conditions and can be added to beer without in any way impairing its stability or brilliance. For this purpose it may be advantageous to homogenize the preparation in a colloid mill and add it in such form to the beer at least 24 hours prior to final filtration, and preferably at the beginning of storage. Filtration does not eliminate the foam-forming effect of the propylene glycol alginate. However, if filtration is not carried out the propylene glycol alginate may in certain cases give rise to a subsequent undesirable opalescence in the beer. Homogenization of the preparation will tend to reduce or eliminate any opalescence formation in the beer.

The following examples illustrate satisfactory procedures for carrying out the invention, but it will be understood that they are presented purely for purposes of illustration and not as indicating the limits of the invention.

Example 1

Beer is fermented in the usual way, and filtered through a coarse filter. To each liter of the resultant turbid solution are added 10 cc. of a homogenized 1% solution of high viscosity propylene glycol alginate. After standing for two to three days, the suspension is filtered with the aid of a clarifying agent, such as Celite (diatomaceous earth), yielding a brilliant solution.

Example 2

Beer is fermented in the usual way and filtered clear. To each liter of the filtrate are added 10 cc. of a homogenized 1% solution of high viscosity propylene glycol alginate. The beer may then be refiltered if necessary to remove any slight haze.

While the propylene glycol alginate can be added during the fermentation or even to the mash prior to the fermentation, we prefer to add it after the fermentation is completed, to avoid loss of the material by adsorption or absorption by the yeast and other solid material.

We claim:

1. The method of stabilizing the foam of normally foam-producing but acid-reacting beverages, which comprises adding to the beverage a solution of a water- and acid-soluble, heat stable, propylene glycol alginate in a quantity up to about 500 parts of the alginate per million parts of the beverage.

2. The method of improving the foam of fermented malt beverages which comprises adding to the beverage a solution of a water- and acid-soluble, heat stable, propylene glycol alginate in a quantity up to about 500 parts of the alginate per million parts of the beverage.

3. The method according to claim 1, in which the concentration of propylene glycol alginate in the beverage is of the order of 50 to 500 parts per million.

4. The method according to claim 1, in which the propylene glycol alginate is homogenized before mixing with the beverage.

5. The method of claim 2, in which the propylene glycol alginate is added in the period after completion of the fermentation, but at least 24 hours before final filtration of the fermented brew.

6. The method of claim 1, in which the propylene glycol alginate is of a high viscosity.

7. A normally foam-producing, acid-reacting beverage characterized by a stabilized foam and containing a small proportion of dissolved propylene glycol alginate up to about 500 parts per million of the beverage.

8. A fermented malt beverage capable of forming a highly stable foam and containing a small quantity of a soluble propylene glycol alginate up to about 500 parts per million of the beverage.

9. A fermented malt beverage capable of forming a highly stable foam and containing a water- and acid-soluble, heat-stable propylene glycol alginate in the proportion of about 50 to 500 parts per million.

10. A beer capable of forming a highly stable foam and containing a small quantity of propylene glycol alginate up to about 500 parts per million of the beer.

JAMES S. WALLERSTEIN.
ARTHUR L. SCHADE.
HILTON B. LEVY.

REFERENCES CITED

The following references are of record in the file of this patent:

UNITED STATES PATENTS

| Number | Name | Date |
|---|---|---|
| 193,476 | Bowker | July 24, 1877 |
| 1,181,770 | Just | May 2, 1916 |
| 2,068,738 | File | Jan. 26, 1937 |
| 2,128,432 | Ramage | Aug. 20, 1938 |
| 2,159,167 | Lillienfeld | May 23, 1937 |
| 2,426,125 | Steiner | Aug. 19, 1947 |